UNITED STATES PATENT OFFICE.

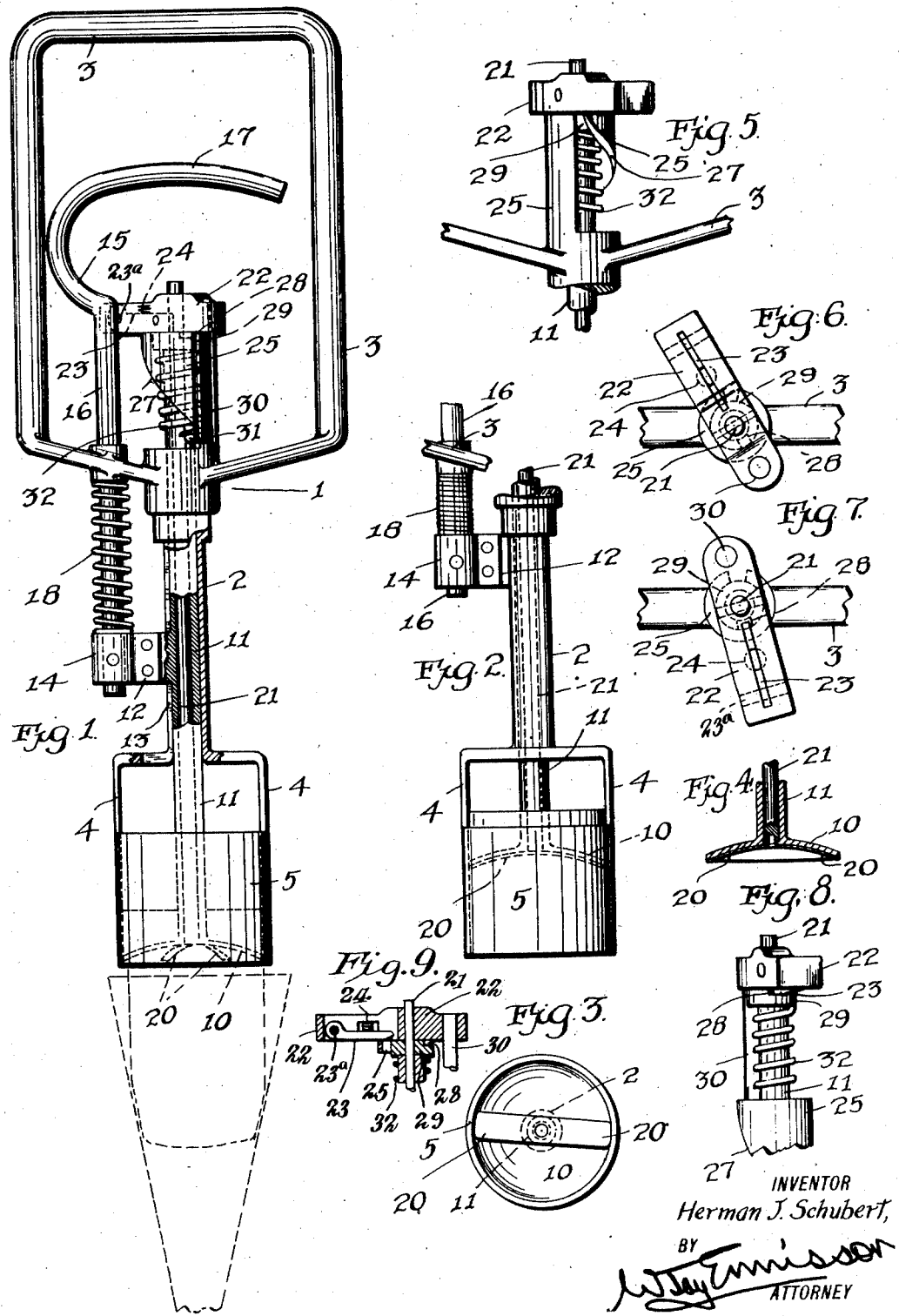

HERMANN J. SCHUBERT, OF HACKENSACK, NEW JERSEY.

MERCHANDISE MEASURING AND FILLING MECHANISM.

1,360,324. Specification of Letters Patent. Patented Nov. 30, 1920.

Application filed August 30, 1917. Serial No. 188,925.

*To all whom it may concern:*

Be it known that I, HERMANN J. SCHUBERT, citizen of the United States, residing at No. 17 First street, Hackensack, Bergen county, New Jersey, have invented new and useful Improvements in Merchandise Measuring and Filling Mechanism, of which the following is a specification.

The present invention relates to devices for handling and measuring merchandise whereby the hand does not come in contact with the material itself, which is thereby more directly, efficiently and economically transferred from the bulk form into small receptacles and containers.

An object of my invention is to produce a mechanism of the class described which not only transfers from a larger mass of material to be measured, a predetermined quantity thereof, but which provides means for cleansing itself of any portions of the material which may adhere to the surfaces of the measuring parts.

Another object of my improved measuring device is to mold the medium upon which it operates into certain desired forms and to insert the molded portion in a predetermined manner into the receptacle designed for its keeping.

In its general characteristics my invention comprises a measuring cup that may be forced into the mass of material to be measured out, which measuring cup is designed for use in connection with a medium of a nature to remain intact within the cup or bowl upon the withdrawal of the latter; to which mechanism is added for immediately discharging the contents cleanly from the said chamber. A discharging plunger within the bowl forms the top end thereof and is adapted to be forced longitudinally thereof touching along the sides of the measuring cup for the purpose of removing the contents and properly inserting them into the receptacle provided therefor. Thus the peripheral edge of the plunger is fitted to scrape the inner surfaces of the measuring bowl, which plunger is itself provided with means for scraping off its own surface which comes into contact with the medium acted upon.

My improvement is especially adapted to measuring out small portions of ice cream and is found particularly serviceable in filling cone-shaped cakes of edible material which have recently come into wide-spread use and are termed colloquially as "ice cream cones." These confections are usually made up at the time they are purchased, and it is therefore desirable to employ convenient means for neatly and rapidly filling the cones with the desired portion of ice cream, which requires that a definite quantity of cream be selected each time and properly inserted into the converging interior of the cone cake.

Reference is had to the drawings illustrative of a preferred form of my invention and made a part of this specification, of which—

Figure 1 is an elevation of the device with a portion shown in section;

Fig. 2 is a partial view of parts shown in Fig. 1, in which a portion are shown relatively moved;

Fig. 3 is an inverted plan of parts shown in Fig. 2;

Fig. 4 is a section elevation of parts shown in Fig. 3;

Fig. 5 is a partial rear view of parts shown in Fig. 1;

Figs. 6 and 7 are respective top plan views of mechanism shown in Fig. 5.

Fig. 8 is an elevation of the parts shown in Fig. 5, but in a different position, and Fig. 9 is a sectional elevation of certain of the parts.

Having reference to the drawings: The numeral 1 represents the device as a whole (as shown in Figs. 1 and 2) which comprises the tubular body member 2 upon the upper end of which is rigidly secured the handle piece 3 and having similarly attached at its lower end the straps 4 which support the cup member 5.

The cup member 5 is cylindrical in form and has its lower edge sharpened for cutting into the medium, being suitably held in position for entering therein by means of the straps 4 which in the form shown are two in number and extend outwardly and downwardly to the point where attached to or made integral with the cup member 5.

For the present purpose it is deemed sufficient to describe this portion of my device as applicable to filling cones having circular tops and accordingly the cup portion conforms to a true cylinder.

The plunger 10 is adapted to fit neatly into the inner cylindrical surfaces of the cup portion so as to be reciprocated longitudinally therein when desired to discharge its contents. In the form illustrated the under surface of the plunger is concaved for the purpose of imparting a rounded effect to the top portion of the cream or other substance thus forced out by the plunger.

The plunger head 10 is operably supported upon an end of a tubular rod 11 which slidably fits into the bore of the body piece 2, thereby supplying the means for guiding the reciprocating plunger 10 within the measuring cup 5. The plunger actuating means comprises the bent gripping rod 15 having a straight portion 16 and a transversely formed handle 17, and which at its lower end is attached by means of a connecting strap 12 which rigidly secures the end of the gripping member 15 to the rod 11, a longitudinal slot 13 having been cut through the side of the body member 2 to guide the end of the strap 12. The straight section 16 of the gripping member 15 is held parallel to the body member 2, the upper portion thereof passing through a guiding orifice suitably provided in the handle piece 3. Upon the lower end of the section 16 is a collar 14 formed by the strap 12 upon which bears one end of the open compression spring 18 wound on the shank 16 of the grip and having its upper end pressing against the handle piece 3. Hence, by action of the spring 18 the grip 15 and the tubular plunger rod 11 are held normally in the position shown in Fig. 1; the connecting straps 12 being thus held against the bottom of the slot 13 and the plunger likewise at the bottom of the cup 5.

The plunger 10 is normally held at the lower end of the cup by the spring action just explained, the cup portion having been thus automatically emptied of its contents. To draw the plunger member 10 into the receptive position in the cup as shown in Fig. 2 the operator seizes the upper transverse bar of the handle 3 and simultaneously grips the parallel portion 17 of the bent rod 15, and upon drawing the two members together the tubular rod attached to the grip 15 is raised against the action of the spring 18 until the strap 12 reaches the top of the slot 13, in coming into which position it has carried the plunger to the top of the cup. The length of the slot 13, it will be seen, determines the quantity of cream to be selected, which with the height of the cup can be lengthened to any desired extent.

Within the concave surface of the plunger are two similar scraper blades 20 curved to correspond to the concavity thereof, which are rigidly attached to the lower end of the rod 21 that is rotatably supported within the hollow tubular plunger rod 11 so as to hold the blades 20 closely against the under surface of the plunger. To hold the rod 21 in the position to which it has been rotated in a manner presently to be described, a latch supporting bar 22 is pinned to its top end and acts in a double capacity, one function of which is that of a sustaining collar for the rod 21, the under side of the bar 22 resting upon the top of the cam bracket 25 which projects upwardly from the body member to which it is rigidly attached.

The bar 22 extends laterally in opposite directions, one end carrying a downwardly extending camming arm 30 upon the lower end of which is a lug or pin 31 that extends inwardly to contact a spirally disposed cam path of the bracket 25 above referred to. Upon the longer end of the arm 22 referred to above, is the latch 23 which is pivotally supported at 23ᵃ within a slot (not shown) in the arm and normally pressed downwardly upon the top of the bracket 25 by means of the short spring 24.

The cam bracket 25 incloses and partially conceals a torsion spiral spring 32 which has one end fixed to the collar 29 of the rod 11, the other attached to the lug 31, thereby designed to hold the pin against the cam 25 which is adapted to impart to the rod 21 and the cleansing blades 20 movement somewhat in excess of half a rotation thereof as those parts are carried upwardly into the position shown in Fig. 2 at which point the latch 23 as shown in Fig. 7 will be forced into the square notch 28 in the top of the collar 29 on the tubular rod 11.

The plunger having been carried up into the position shown in Fig. 2 as described, the cleansing blades 20 have been rotated thereby into the position in which by action of the latch 23 they are held under tension of the spring 32. It is therefore apparent that upon releasing the latch 23 from the notch 28 the spring 32 will snap the cleansing blades back into their normal position of rest, which as pointed out is over half of a complete turn thereof. Hence, as there are two of these blades extending oppositely, it will readily be seen that they together cover in their sweep the entire under surface of the plunger, thereby completely cleansing that member by the action described.

It remains to describe in this connection the means employed in unlatching the rod that carries the cleansing arms at the most advantageous point of their operation, namely, when the plunger is down. Thus it has been seen that the tubular rod 11 and with it the rotatable rod 21 are forced into the locked position described as these parts are carried upwardly, the latch 23 and the notched collar 29 being thus elevated into a position directly above the annular bearing surface at the top of the cam bracket 25 on the body member 2.

Having carried the parts into the locked position described by means of the handle of the grip 15 thereby compressing its spring 18, it will be seen that on releasing the grip the rod will be thrown downwardly by action of the spring thus bringing the latch 23 down upon the top surface of the cam bracket 25 with sufficient force to raise it out of the notch 28. The latch having been thus released, thereupon by action of the torsion spring 32 the rotatable action of the blades 20 above referred to will follow, cleansing the plunger in the manner described. The notch need be but a small fraction of an inch in depth so that the releasing of the latch will occur at the extreme end of the downward travel of the plunger, which will be at the moment of the withdrawal of the device after discharging its load.

To operate my device in connection with an ice cream cone, for example, the handles 3 and 17 are both gripped by the hand and drawn together, bringing the plunger 15 to the top of the cup 5 as shown in Fig. 2, in which position the cleansing blades 20 by action of the cam 27 upon the lug 31 are forced against the action of the spring 24 into a locked position in which the latch 23 is held by the notch 28; and simultaneously with the setting of the parts as described, the cup 5 is forced into the mass of cream from which the cones are to be filled, and with relative arrangement of parts undisturbed the device is withdrawn and placed over the open top of the hollow cone or other receptacle therefor, whereupon the grip on the handles is immediately released and the contents of the cup 5 forced out by the plunger 10 by action of the compression spring 18 into the receptacle. The cleansing blades 20 at the end of the thrust downwardly are rotated by action of the torsion spring 32, by reason of the latch 23 contacting upon the top surface of the cam bracket 25 and being thereby lifted from the notch 28.

Having described my invention, what I claim is:

1. In a measuring device comprising a bowl, a plunger reciprocal therein, radial blades adjacent said plunger and automatic means for rotating said blades after the plunger has substantially completed its discharge stroke.

2. In a measuring device comprising a bowl, a plunger having a concave surface, radial blades conforming to the concavity of said surface and automatic means for rotating said blades after the plunger has substantially completed its discharge stroke.

3. In a measuring device comprising a bowl, a plunger in said bowl having radial blades adjacent said plunger; means for reciprocating said plunger, and means for rotating said blades at the end only of a reciprocal downward motion of said plunger.

4. In a measuring device comprising a bowl, a plunger in said bowl having radial blades adjacent said plunger, a spring actuated gripping member for reciprocating said plunger, and means coacting with said member for rotating said blades at the end only of a reciprocal downward motion of said plunger.

5. In a measuring device comprising a bowl, a plunger in said bowl having radial blades adjacent said plunger; a gripping member for reciprocating said plunger; and spring actuating means for rotating said blades at the end of each discharge stroke of said plunger.

6. In a measuring device having a frame with a handle, a bowl rigidly attached to said frame having a reciprocal plunger therein; means for reciprocating said plunger comprising a gripping member and an actuating spring thereon, radial blades rotatably mounted on said plunger; means for rotating said blades comprising a shaft to which said blades are attached; a blade actuating spring coiled upon said shaft; means for setting said spring by said gripping member, comprising a latch device, said spring having one end attached to said shaft; a bracket secured to said frame having a spirally disposed cam path thereon.

7. In a measuring device having a frame with a hollow body portion and a handle and a cutting bowl rigidly attached to said body portion; a reciprocal plunger supported within said bowl upon a tubular shaft slidably mounted within said body portion; radial blades mounted adjacent said plunger upon a rod rotatably mounted in the said tubular shaft; means for reciprocating said plunger comprising a gripping bar rigidly attached to said shaft and slidably mounted upon said frame; said bar comprising a shank and a handle portion disposed approximately parallel to the handle on said frame; a compression spring on said shank; means for rotating said rod comprising a bracket upon said frame having a spirally disposed cam path thereon and a torsion spring on said tubular shaft, said spring having one end attached to said tubular shaft and the other end attached to said bracket; a crank arm attached to said rod having a spur adapted to engage said cam; a torsion spring on said tubular shaft and attached thereto at one end and having the other end secured to said spur; a spring actuated latch in said crank arm; and a notch in the top of said tubular shaft adapted to receive said latch therein.

In testimony whereof I have signed my name to this specification in the presence of two subscribing witnesses, this 25th day of August, 1917.

HERMANN J. SCHUBERT.

Witnesses:
STEWART MAURICE,
MARION HEALY.